Figure 1:
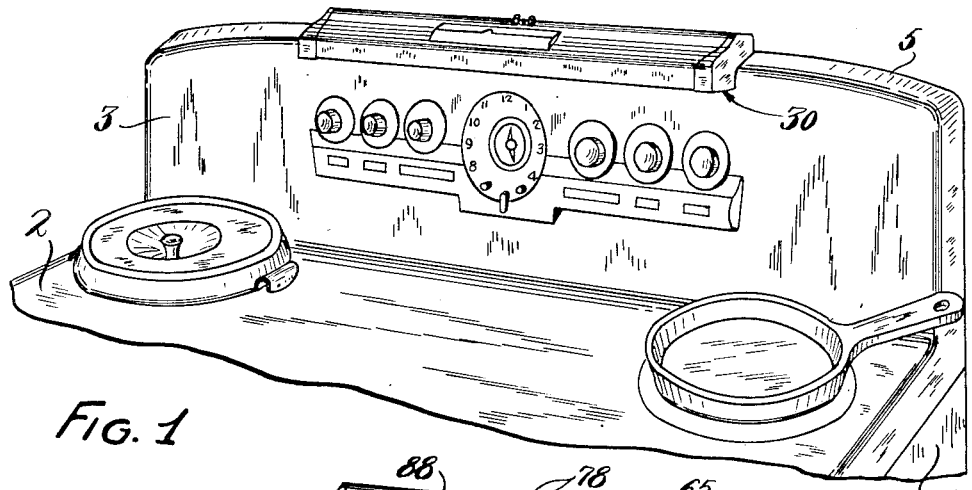

June 21, 1955

L. S. CHADWICK ET AL 2,711,475

VERTICALLY ADJUSTABLE LIGHTING FIXTURE
FOR COOKING STOVES OR RANGES

Filed Aug. 26, 1950

5 Sheets-Sheet 1

INVENTORS
LEE S. CHADWICK
BY HOWARD E. BREHM

West Oldham

ATTORNEYS

June 21, 1955 L. S. CHADWICK ET AL 2,711,475
VERTICALLY ADJUSTABLE LIGHTING FIXTURE
FOR COOKING STOVES OR RANGES
Filed Aug. 26, 1950 5 Sheets-Sheet 2

INVENTORS
LEE S. CHADWICK
HOWARD E. BREHM
BY
West + Oldham
ATTORNEYS

INVENTORS
LEE S. CHADWICK
HOWARD E. BREHM
BY

ATTORNEYS

June 21, 1955
L. S. CHADWICK ET AL
2,711,475
VERTICALLY ADJUSTABLE LIGHTING FIXTURE
FOR COOKING STOVES OR RANGES
Filed Aug. 26, 1950
5 Sheets-Sheet 5
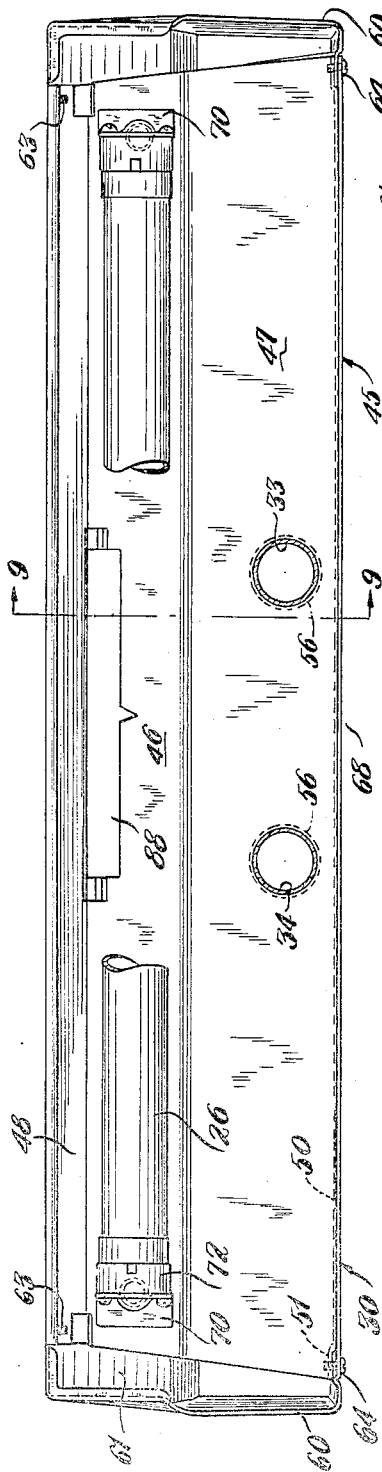
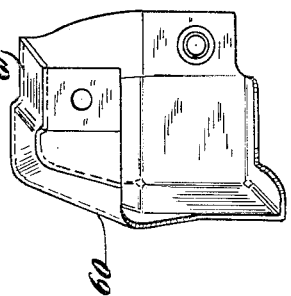
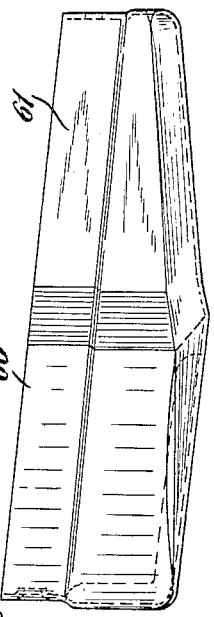
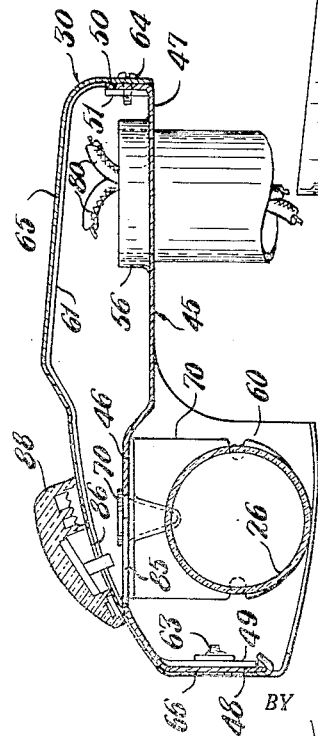
INVENTORS
LEE S. CHADWICK
HOWARD E. BREHM
BY
West T Oldham
ATTORNEYS

United States Patent Office 2,711,475
Patented June 21, 1955

2,711,475

VERTICALLY ADJUSTABLE LIGHTING FIXTURE FOR COOKING STOVES OR RANGES

Lee S. Chadwick, Shaker Heights, and Howard E. Brehm, Cleveland Heights, Ohio, assignors to Perfection Stove Company, Cleveland, Ohio, a corporation of Ohio Application August 26, 1950, Serial No. 181,626

8 Claims. (Cl. 240—2)

This invention relates, generally, to illuminating means for incorporation in cooking stoves or ranges for lighting the tops thereof.

In order to obtain satisfactory illuminating of a stove or range top it is necessary, at times, to have the source of light near the working surface, as when using relatively shallow cooking utensils, such as frying pans or griddles, while, at other times, it is advantageous to have the source of light at a substantially higher elevation in order to properly illuminate the interior of relatively deep vessels.

Therefore, it is the primary purpose of our invention to provide a lighting fixture that is movably supported by the stove or range in proper relation to the working area of the top thereof and that is conveniently adjustable in a vertical direction, and that effectively retains any selected position of adjustment within its range of movement.

Another object of the invention is the provision of a lighting fixture of the above described character that is attractive in appearance and harmonizes with the design of the stove or range, especially when in its lowest or normal position, the invention thus conforming to the growing appreciation for the aesthetic value of modern home appliances.

Other objects are to provide a relatively simple and substantial construction for a lighting fixture of the class to which the invention pertains comprised of relatively few parts that are convenient of assembly; to provide a construction that is capable of being readily installed in a stove or range structure; to provide retaining means, desirably of the friction type, that acts automatically to hold the movable unit of the fixture in any selected position of adjustment, and yet offers minimum resistance to the manual adjustment of such unit, and to provide a fixture of the kind described that is practically immune from disorder, and is very durable in service.

An embodiment of the invention whereby the foregoing and other objects and advantages are attained is illustrated in the accompanying drawings wherein like parts are designated by like reference characters throughout the several views.

Figure 2:
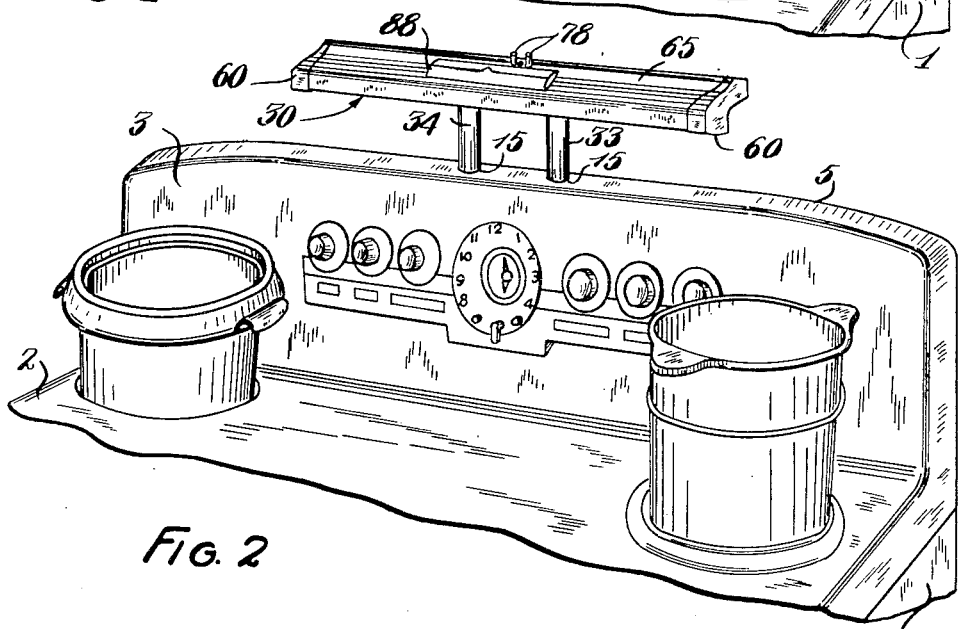
Figure 3:
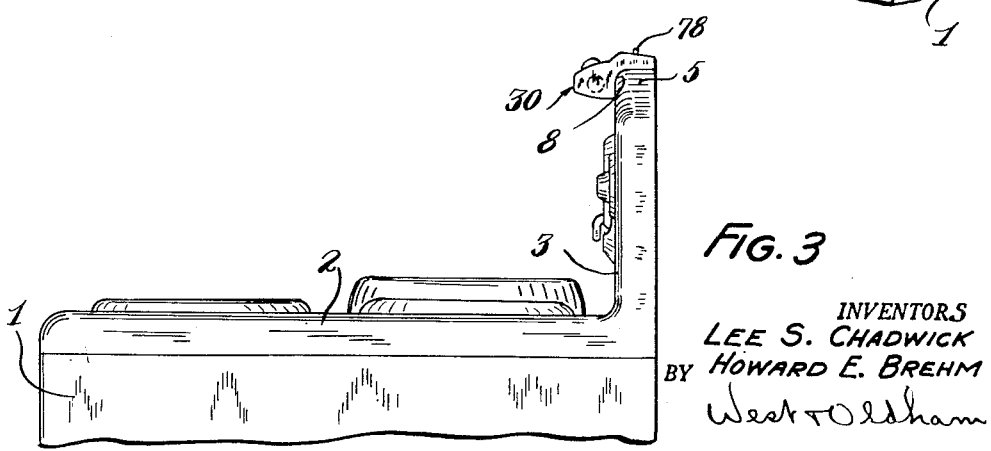
Figure 4:
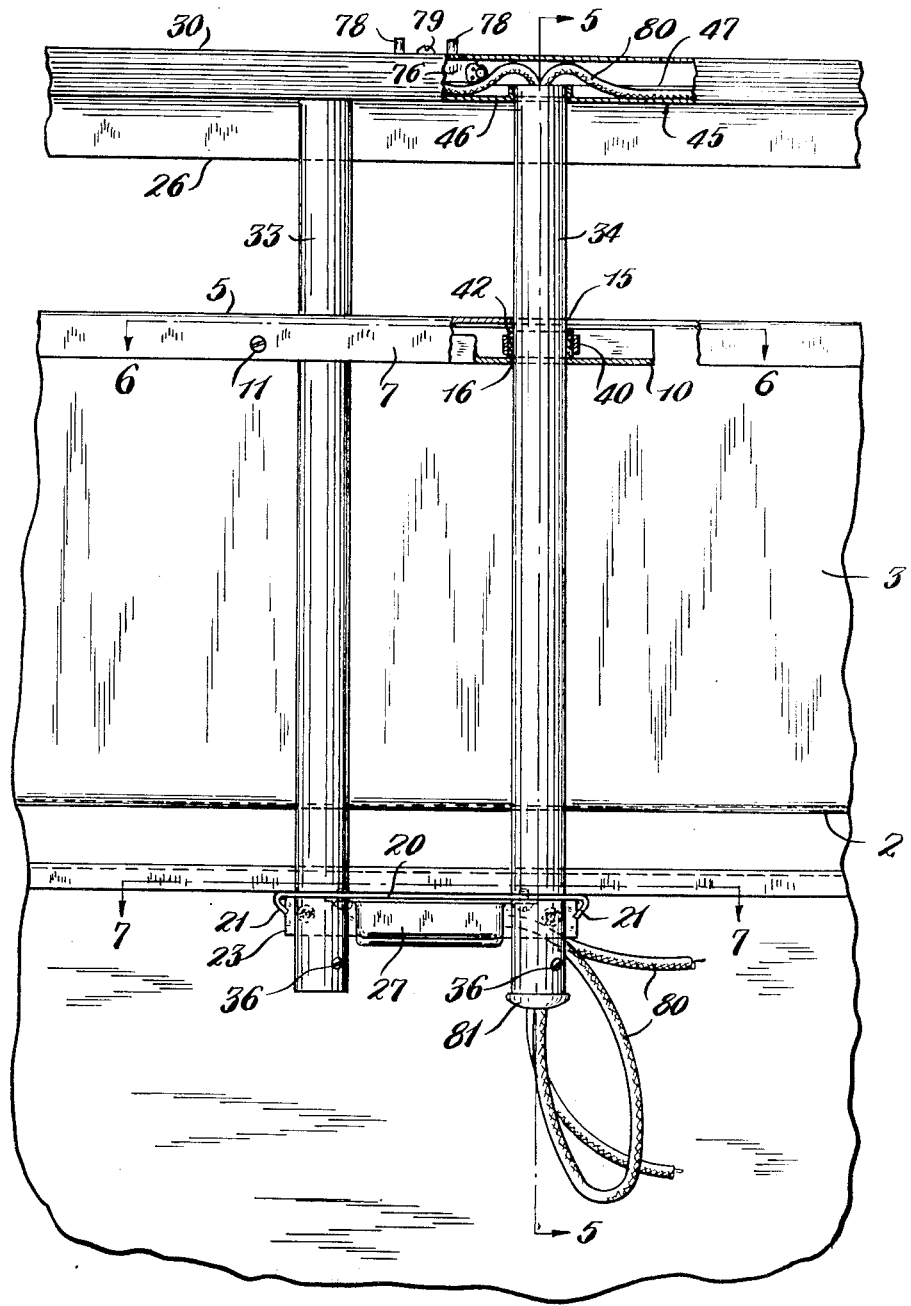
Figure 5:
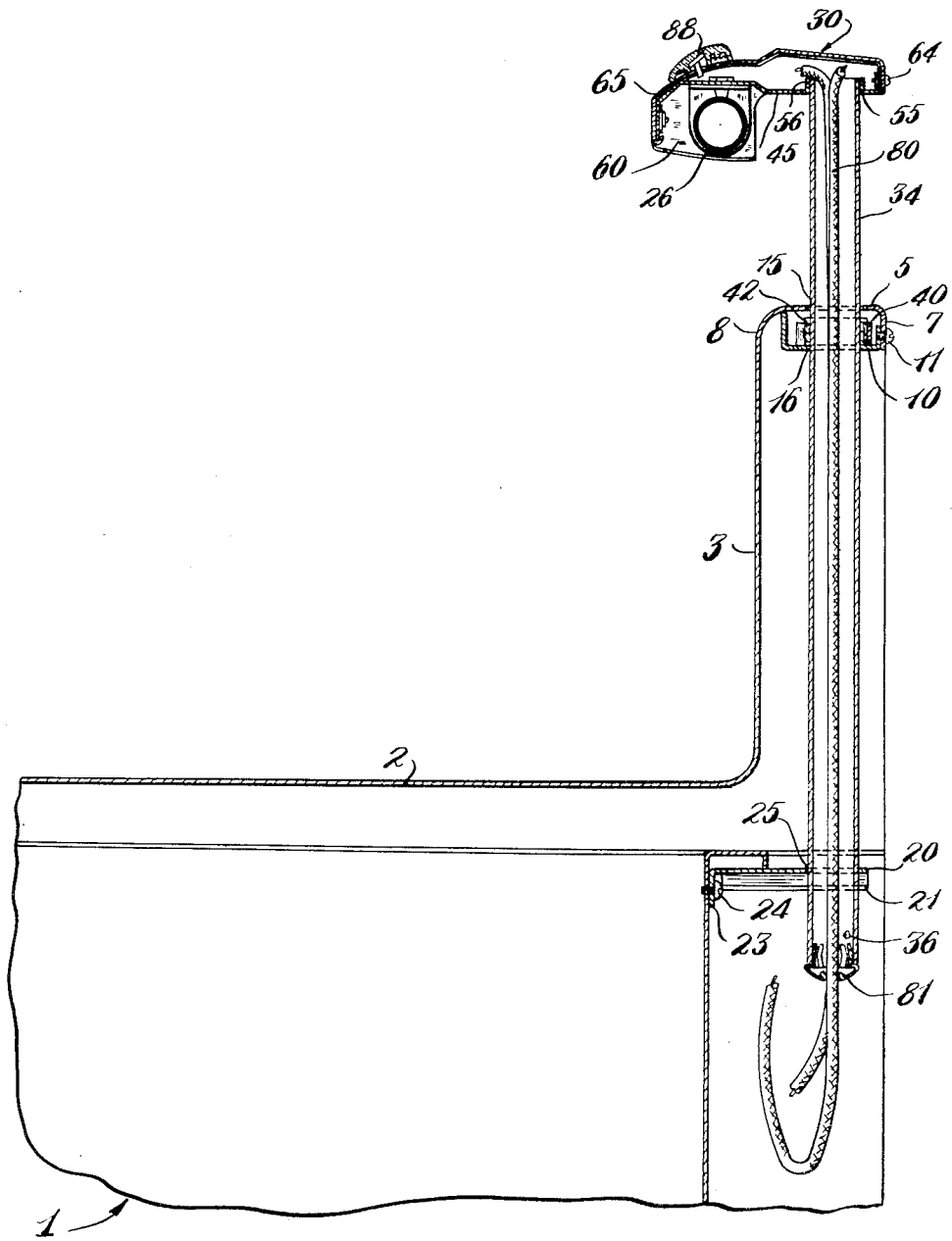
Figure 6:
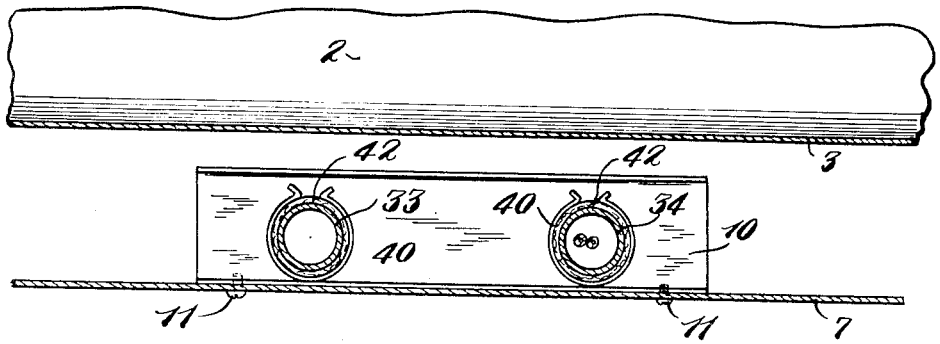
Figure 7:
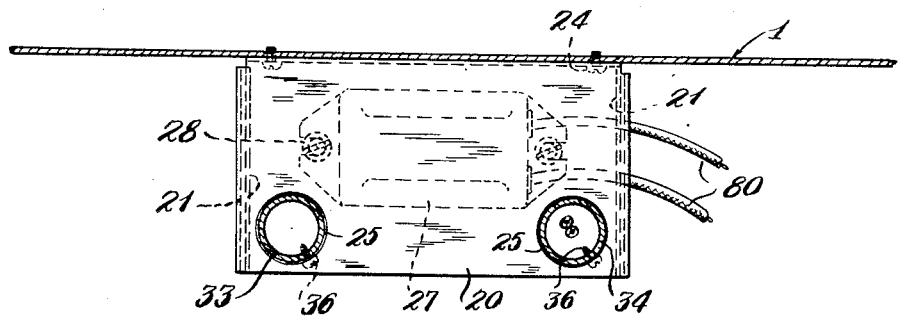

In the drawings, Fig. 1 is a fragmentary perspective view of a cooking range equipped with my improved lighting fixture, this view showing the movable unit or head structure of the fixture in its lowest, or what may be considered normal position; Fig. 2 is a similar view, showing the head structure in an elevated position; Fig. 3 is a fragmentary end elevation of the stove or range, showing the lighting fixture positioned as in Fig. 1; Fig. 4 is a fragmentary rear elevation of the range and fixture showing the head structure in elevated position; Figs. 5, 6 and 7 are sections on the respective lines 5—5, 6—6 and 7—7 of Fig. 4; Fig. 8 represents a bottom plan view of the head structure of the fixture; Fig. 9 is a section on the line 9—9 of Fig. 8, and Figs. 10 and 11 are a rear elevational view and a plan view, respectively, of one of the end caps of the fixture head.

The range in which we have shown our improved lighting fixture incorporated is of the type comprising a body 1 (only a fragment of which shown in the drawings) and a top 2. The latter is drawn from sheet metal and includes a splash back 3. In the formation of the sheet metal unit that includes the top and splash back, a peripheral wall is turned downwardly from the top and rearwardly from the splash back, the portion of said wall that extends across the top of the splash back being designated 5. As best appears from Figs. 4 and 5, a relatively deep flange 7 depends from the rear edge of the wall portion 5, in substantially parallel relation to the plane of the splash back 3. The splash back joins the wall portion 5 through a curved area of liberal radius, as indicated at 8.

Occupying the space beneath the wall portion 5 and between the flange 7 and the opposed part of the splash back 3 is an upwardly facing channel 10 (Figs. 4, 5 and 6) that is fastened to the flange 7 by screws 11. The wall portion 5 is provided with laterally spaced holes 15, and the web of the channel 10 has holes 16 of the same size as the holes 15 and that are in axial alignment with the latter holes.

A plate 20 (Figs. 4, 5 and 7), turned downwardly and inwardly at its ends, as shown at 21, for the purpose of stiffening the plate, is provided along its forward edge with a downturned flange 23 that is fastened, by screws 24, to the rear of the range body 1 immediately below the top 2. The plate 20 has holes 25 that correspond in size with the previously mentioned holes 15 and 16 and are axially aligned therewith.

The illuminating device 26 that is employed in the lighting fixture is preferably of the fluorescent tube variety, and the ballast commonly employed in the circuit of such tubes is conveniently carried by the plate 20. Said ballast, designated 27, is attached to said plate by screws 28.

The head structure of the lighting fixture is designated, generally, by the reference number 30, and it is secured, in a manner presently to be described, to the upper ends of two parallel supports or tubes 33 and 34. These tubes are spaced apart according to the lateral spacing of each pair of holes 15, 16 and 25 and their outside diameter is slightly less than the diameter of said holes so that, when the fixture is assembled as shown in the drawings, said tubes are capable of easy vertical adjustment in said holes. It is apparent from the foregoing that the channel 10 and plate 20, as well as the wall portion 5, constitute guide means incorporated in the range wherein the supports or tubes 33 and 34 are adjustable in a vertical direction. Stop means is provided for preventing withdrawal of the support from the guide means, the same, in the present instance, consisting of screws 36 that are carried by the tubes 33 and 34 and are located adjacent the lower ends of said tubes. Upward movement of said tubes is limited by engagement of the stop means or screws 36 with the plate 20.

Retaining means, preferably of the friction type, are employed to hold the movable unit of the lighting fixture in any selected position of adjustment within the range of its possible vertical movement, and, in the present instance, said retaining means consist of cylindrical bands 40 of spring metal (Figs. 4, 5 and 6) that embrace the tubes 33 and 34 and are confined against appreciable vertical movement between the wall portion 5 and the web of the channel 10, the ends of said bands being deflected outwardly. A sleeve or pad 42 of felt or other suitable friction material is desirably interposed between each band 40 and the corresponding tube. The tension of the bands 40 should be such as will insure the movable unit of the fixture being held in any position to which it is adjusted, and, at the same time, allow adjustment with the least possible effort.

The head structure 30 of the fixture includes a body member 45 that is desirably formed from an elongated piece of sheet metal, a front longitudinal portion 46 of which is elevated somewhat with respect to a rear longitudinal portion 47. Forwardly of the portion 46 the body member is deflected downwardly and terminates in a relatively deep depending front flange 48. Apertured lugs 49 are inset slightly from the ends of the flange 48, and the body portion has an upstanding flange 50 along its rear edge, the extreme ends of which are inset, as shown at 51. The body portion has holes 55 that are surrounded by flanges 56 within which the upper ends of the tubes 33 and 34 are fitted and to which they are secured by welding or other means.

Applied to each end of the body member 45 is an end cap 60, shown as having a depressed area 61 adjacent to and coextensive with its inner edge. At front and back, respectively, said area 61 extends over the apertured lug 49, and the inset terminal portions of the rear flange 50 and are attached to these parts of the body member by screws 63 and 64.

65 is a cover, preferably of sheet metal, having the cross sectional shape shown in Figs. 5 and 9; and its front edge, below a straight portion 66 that overlaps and conceals the front flange 48 of the body member, is curled inwardly about said flange so as to hold the cover to said member along the entire front of the head structure. At the rear, the cover is extended downwardly over the flange 50 of the body member and is secured thereto at the longitudinal center of the head structure by a screw 68. At its ends, the rear depending portion of the cover is fastened to the body member by the same screws 64 that fasten the adjacent portions of the caps 60 to the body member. It is evident from the foregoing description that when the head structure is assembled, no fastening means that secure the several parts together are visible from the front, so that a very neat appearance is presented. It will also be noted that the end caps are shaped on their under sides to conform to the contour of the splash back 3 so that when the fixture is in its lowest or normal position it will present an especially neat appearance, as evident from Figs. 1 and 3.

Secured to the underside of the elevated portion 46 of the body member 45, adjacent each end of the latter, is a bracket 70 that carries a socket 72 which receives the terminals projecting from the adjacent end of a fluorescent tube that constitutes the illuminating device 26, these parts being concealed by the end caps and by the overhanging front portion of the head structure when the fixture is viewed at the usual angle of observation.

Located about midway of the length of the head structure and directly beneath the cover 65 is an electric switch 76 of conventional type provided with push buttons 78 that project upwardly through apertures in the cover; and the switch is secured to the cover by a screw 79. Pursuant to common practice, the electric illuminating device or fluorescent tube 26 is placed in circuit with the switch 76 and with the previously mentioned ballast 27 by electrical conductors, those shown in certain of the views of the drawings being designated 80. Parts of the conductors 80 extend through the tube 34. As will be understood, the conductors consist of the usual insulated wires, and to protect the insulation, where the conductors enter the lower end of the tube, the latter is fitted with a bushing 81, desirably of sheet metal formed with integral prongs that expand within the tube. The head of the bushing has an opening about which the metal is curled inwardly and over to provide a smooth surface for engagement by the conductors.

At about the longitudinal center of the head structure, the body member 45 and cover 65 have elongated openings 85 and 86, respectively (Fig. 9); and applied to the cover over the opening 86 is an ornamental device 88 that is made of transparent plastic or the like and to which certain legend may be applied, as a name or trade-mark. The device 88 is illuminated by light rays that pass from the illuminating device or tube 26 through the openings 85 and 86, said openings corresponding in outline approximately with the area of the device 88 embracing the legend.

It will be seen from the foregoing disclosure that our invention provides a neat and attractive lighting fixture for the tops of cooking stoves or ranges that is convenient of adjustment in a vertical direction and will automatically retain its position of adjustment, and that harmonizes with the design of the stove or range.

It may be explained that the term "ranges" as used in the appended claims is not to be construed as limiting, as it is intended to embrace all cooking stoves or appliances wherewith my invention is adapted for use. It is to be further understood that the invention is susceptible to such changes and modifications as come within the scope of said claims.

Having thus described our invention, what we claim is:

1. A vertically adjustable lighting fixture for ranges of the type including a back having a rearwardly extending substantially horizontal wall portion along the top thereof provided with holes; said lighting fixture comprising a head structure mounting an illuminating device, a pair of elongated cylindrical supports connected to and depending from the head structure, means for attachment to the rear of the range back in vertically spaced relation to said wall portion and having holes aligned with those of the wall portion, said supports being guided for vertical movement within the holes of said means and wall portion, retaining means comprising bands of resilient metal encircling the cylindrical supports and confined between the former means and said wall portion, the contracting force of said bands being constant and sufficient to retain the supports and head structure in any selected position of vertical adjustment in opposition to the weight of said parts, but insufficient to prevent said parts from yielding to moderate manual force.

2. The combination and arrangement of elements defined by claim 1, plus: pads of friction material interposed between the said bands and supports and being wider than the bands and projecting above and below the same for engagement with said wall portion of the range back and the first mentioned means.

3. A vertically adjustable lighting fixture for ranges of the type including a splash back and wherein a wall portion extends rearwardly from the top of the splash back and is extended downwardly at its rear edge to provide a flange, a member secured to said flange between the latter and the splash back and in downwardly spaced relation to said wall portion, a second member attached to the rear of the range adjacent the bottom of the splash back, said members and the aforesaid wall portion having laterally spaced circular apertures, a head structure mounting an illuminating device, a pair of cylindrical tubular supports secured to and depending from the head structure and extending downwardly through the apertures in the aforesaid wall portion and in said members for vertical adjustment therein, retaining means comprising bands of resilient metal encircling said supports and confined between the first mentioned member and said wall portion, said bands exerting sufficient friction upon said supports to hold them under the weight of the head structure in any selected position of adjustment.

4. The combination and arrangement of elements defined by claim 3, plus: pads of friction material interposed between said bands and the supports and projecting above and below the latter for contact with said wall portion and the first mentioned member.

5. In a fixture of the class described, a head structure comprising an elongated sheet metal body member having a relatively deep depending flange along its front edge, end caps applied to the ends of the body member and provided with parts that overhang and are spaced above the adjacent portions of the body member, fastening means securing the end caps to said member, a cover extending over said body member in spaced relation thereto and overlapping and sustained by said parts of the end caps and concealing certain of said fastening means, said cover including a portion substantially coextensive in area with and overlying said depending flange of the body member, and an electrical illuminating device suspended from the body member in closely spaced relation thereto and rearwardly of said depending flange.

6. In a lighting fixture of the class described, a head structure comprising an elongated sheet metal body member provided with a relatively deep depending flange along its front edge and a shallow upstanding flange along its rear edge, caps applied to the ends of the body member in overlapping relation thereto, the portions of said caps overlying the ends of the body member being depressed to form shallow seating areas, fastening means at the front and rear of each cap for securing the cap to the aforesaid flanges of the body member, the portions of the depending flange to which said caps are secured being inset from the remainder of said flange so as to dispose the fastening means at the front of the caps substantially within the plane of the front surface of said depending flange, a sheet metal cover provided along its front edge with an inwardly and upwardly projecting lip that is engaged about the lower edge of said depending flange, the cover extending rearwardly over the body member in spaced relation thereto and in contact with the seating areas of the caps and having along its rear edge a flange that overlies the upstanding flange of the body member, fastening means securing the cover along its rear edge to the last mentioned flange, the cover concealing the fastening means at the front of the caps, the body member having adjacent its longitudinal center two holes that are spaced apart along said member, flanges rising from the body member about said holes, tubular supports having their upper ends confined within and fastened to said flanges, and an illuminating device secured to and suspended from the body member adjacent the front thereof.

7. In a lighting fixture of the class described, a head structure comprising an elongated sheet metal body member provided with a relatively deep depending flange along its front edge and a shallow upstanding flange along its rear edge, caps applied to the ends of the body member in overlapping relation thereto, the portions of said caps overlying the ends of the body member being depressed to form shallow seating areas, fastening means at the front and rear of each cap for securing the cap to the aforesaid flanges of the body member, the portions of the depending flange to which said caps are secured being inset from the remainder of said flange so as to dispose the fastening means at the front of the caps substantially within the plane of the front surface of said depending flange, a sheet metal cover provided along its front edge with an inwardly and upwardly projecting lip that is engaged about the lower edge of said depending flange, the cover extending rearwardly over the body member in spaced relation thereto and in contact with the seating areas of the caps and having along its rear edge a flange that overlies the upstanding flange of the body member, fastening means securing the cover along its rear edge to the last mentioned flange, the cover concealing the fastening means at the front of the caps, the body member having adjacent its longitudinal center two holes that are spaced apart along said member, flanges rising from the body member about said holes, tubular supports having their upper ends confined within and fastened to said flanges, the front portion of the body member being elevated with respect to the rear portion thereof, brackets secured to the underside of and depending from the elevated front portion of the body member adjacent the ends of the latter, electrical sockets secured to said brackets, a fluorescent tube sustained by and between said sockets and extending along the body member to the rear of the depending flange thereof, and electrical conductors extending upwardly through one of said tubes and into the space between the body member and cover and having connection with said sockets thereby to provide a circuit including said tube.

8. The combination and arrangement of parts defined by claim 7, plus: a switch in the space between the body member and cover at about the longitudinal center of the structure and which is included in said circuit, the switch having actuating means and the cover being formed to afford access to said means from outside the cover.

References Cited in the file of this patent

UNITED STATES PATENTS

| | | |
|---|---|---|
| 558,609 | Peeples | Apr. 21, 1896 |
| 2,075,199 | Horner | Mar. 30, 1937 |
| 2,210,681 | Lockwood | Aug. 6, 1940 |
| 2,236,778 | Mitchell | Apr. 1, 1941 |
| 2,254,134 | Berry | Aug. 26, 1941 |
| 2,262,157 | Beals | Nov. 11, 1941 |
| 2,308,986 | Livers | Jan. 19, 1943 |
| 2,312,617 | Beck | Mar. 2, 1943 |
| 2,337,719 | Hueglin | Dec. 28, 1943 |
| 2,382,878 | Holecek | Aug. 14, 1945 |
| 2,569,130 | Katsetos | Sept. 25, 1951 |

FOREIGN PATENTS

| | | |
|---|---|---|
| 333,781 | Germany | Mar. 2, 1921 |
| 845,909 | France | May 22, 1939 |
| 681,649 | Germany | Sept. 27, 1939 |